ated Oct. 7, 1958

2,855,392

COBALTIFEROUS AZO-DYESTUFFS

Arthur Buehler, Rheinfelden, and Christian Zickendraht, Binningen, Switzerland, assignors to Ciba Limited, Basel, Switzerland, a Swiss firm No Drawing. Application September 2, 1954
Serial No. 453,932

Claims priority, application Switzerland
September 8, 1953

10 Claims. (Cl. 260—145)

This invention relates to cobaltiferous azodyestuffs and a process for their manufacture.

The invention is based on the observation that valuable, new cobaltiferous azo-dyestuffs are produced, which contain one atom of cobalt in complex combination with two molecules of different monoazo-dyestuffs, when agents providing cobalt are reacted upon mixtures of an o-hydroxy-o′-amino-monoazo-dyestuff which is free from water-solubilizing groups and of such an o:o′-dihydroxy-monoazo-dyestuff as is free from sulfonic acid and carboxyl groups and contains as water-solubilizing group at least one sulfonamide or sulfone group.

The o-hydroxy-o′-amino-monoazo-dyestuffs serving as starting materials in the present process can be obtained by coupling an o-hydroxydiazo-compound which is free from water-solubilizing groups, i. e. from sulfonic acid and carboxyl groups and also from sulfonamide and sulfone groups, with an aromatic amine, which is likewise free from water-solubilizing substituents and which couples in o-position to the amino group. The specified coupling can take place by conventional methods, preferably in an acid or neutral medium.

There are suitably used as o-hydroxydiazo-compounds, diazo-compounds of such o-hydroxyamines of the benzene series of which the benzene nuclei contain in addition to the hydroxyl and the amino group also further substituents, such as halogen atoms (for example chlorine), alkyl groups (for example methyl), alkoxy groups (for example methoxy), acylamino groups or preferably nitro groups.

As examples of such o-hydroxyamines there may be mentioned: 4-methyl-, 4-methoxy- and 4-chloro-2-amino-1-hydroxybenzene, 4:6-dichloro-2-amino-1-hydroxybenzene, 4-methyl-5- or -6-nitro-2-amino-1-hydroxybenzene, 4-chloro-5- or -6-nitro-2-amino-1-hydroxybenzene and especially 4-nitro-6-chloro-2-amino-1-hydroxybenzene, 6-nitro-4-acetylamino-2-amino-1-hydroxybenzene, 4-nitro-6-acetylamino-2-amino-1-hydroxybenzene, 4:6-dinitro-2-amino-1-hydroxybenzene and primarily 4-, 5- or 6-nitro-2-amino-1-hydroxybenzene.

As coupling components are especially useful naphthylamines free from solubilizing groups which are capable of coupling in o-position to the amino group. As examples there may be mentioned: 2-phenyl- and 2-methylaminonaphthalene, 6-bromo- and 6-methoxy-2-aminonaphthalene, 6-methyl-2-aminonaphthalene and primarily 2-aminonaphthalene itself. Instead of this latter component, 2-aminonaphthalene-1-sulfonic acid can also be used, since this acid couples in 1-position with splitting off of the sulfonic acid group and therefore leads to the same starting dyestuffs as 2-amino-naphthalene itself.

The o:o′-dihydroxy-monoazo-dyestuffs which are used together with the o-hydroxy-o′-amino-monoazo-dyestuffs just mentioned for the preparation of the mixture used as starting materials in the present process, can be produced from dyestuff components containing sulfonamide or sulfone groups and which are free from sulfonic acid and carboxyl groups, as for example by coupling an o-hydroxydiazo-compound of the benzene series with a compound which couples in the adjacent position to a hydroxyl group or an enolizable keto-group, in which case the coupling component and/or with advantage the diazo component can contain a sulfonamide or a sulfone group, for example a phenyl or methyl sulfone group. Of especial value have proved the dyestuffs containing at least one sulfonamide group.

As o-hydroxydiazo-compounds for the preparation of these dyestuffs those are useful, for example, as have been mentioned above for the preparation of the o-hydroxy-o′-amino-dyestuffs. These diazo-compounds which are free from sulfonamide and sulfone groups are only to be coupled with azo components which contain a sulfone or a sulfonamide group. Especially good results are obtained with diazo-compounds of amines containing sulfone or sulfonamide groups, as for example the diazo-compounds of 2-amino-1-hydroxybenzene-4- or -5-sulfonamide, of 6-nitro - 2 - amino - 1 - hydroxybenzene-4-sulfonamide, of 4-chloro-2-amino - 1 - hydroxybenzene-5-sulfonamide, of 6-chloro-2-amino-1-hydroxybenzene-4-sulfonamide or of 4-nitro-2-amino-1-hydroxybenzene-6-sulfonamide or of the corresponding N-aryl- or N-alkyl-substituted sulfonamides; moreover with diazo-compounds from 2-amino-1-hydroxybenzene-4- or -5-methyl sulfone, 4-chloro-2-amino - 1 - hydroxybenzene-5- or -6-methyl sulfone, 2-amino-1-hydroxybenzene-4- or -5-phenyl- or -benzyl sulfone.

As examples of suitable coupling components of the specified type there may be mentioned: Compounds with phenolic hydroxyl group, such as p-substituted hydroxybenzenes, for example, 4-methyl-1-hydroxybenzene, 4-isopropyl-1-hydroxybenzene, 4-tertiary amyl-1-hydroxybenzene, 2:4- or 3:4-dimethyl-1-hydroxybenzene, 4-acetylamino-3-methyl- or 4-methyl-2-acetylamino-1-hydroxybenzene, 4-acetylamino-1-hydroxybenzene, furthermore hydroxynaphthalenes as for example 1-benzoylamino- or 1-acetylamino-7-hydroxy-naphthalene, 1-n-butyrylamino-7-hydroxynaphthalene, 1 - carbomethoxyamino-7-hydroxynaphthalene, 2-hydroxynaphthalene, 6-bromo- or 6-methoxy-2-hydroxynaphthalene, 5-chloro or 5:8-dichloro-1-hydroxynaphthalene, 1-hydroxynaphthalene-4- or -5-sulfonamide, 2-hydroxynaphthalene-6-sulfonic acid-N-methyl-N-β-hydroxyethylamide, 2-hydroxynaphthalene-6-sulfonamide, hydroxquinolines, barbituric acids or pyrazolones, as for example 1-phenyl-3-methyl-5-pyrazolone, 1-(2′-, 3′- or 4′-chlorophenyl)-3-methyl-5-pyrazolone, 1-phenyl-3-methyl-5-pyrazolone-3′-sulfonamide, 1 - phenyl-3-methyl-5-pyrazolone-3′-or 4′-sulfonic acid methylamide, 1:3-diphenyl-5-pyrazolone, 2:4 - dihydroxyquinoline, 5-chloro-8-hydroxyquinoline and primarily compounds which contain a carbon atom which is capable of coupling in an open chain, especially β-ketocarboxylic acid derivatives, for example acetoacetic acid-isopropyl ester but preferably β-ketocarboxylic acid arylamides, as for example acetoacetanilide, acetoacetic acid-o-, -m- or -p-chloranilide, 1-acetoacetylaminobenzene-3- or -4-sulfonamide, 1-acetoacetylaminobenzene-2-, -3- or -4-methyl sulfone, 1-acetoacetylaminobenzene-3- or -4-sulfonic acid methylamide.

In this case also the coupling can take place by conventional methods, for example in an alkaline medium.

In carrying out the process it is to be recommended in general to use for a mixture of about one molecular proportion each of two different dyestuffs of the specified type, about one gram atom of cobalt contained in a corresponding quantity of an agent providing cobalt, and/or to carry out the metallization in a medium within the range from faintly acid to alkaline. Of good suitability for carrying out the process are, for example, complex cobalt compounds of aliphatic o-hydroxy- or dicarboxylic acids which contain the cobalt in complex combination. In general, however, there are used simple salts of divalent cobalt such as cobalt sulfate or acetate or, if desired, freshly precipitated cobalt hydroxide.

The conversion of the dyestuffs into the complex cobalt compounds takes place with advantage in the hot, in an open vessel or under pressure, if desired in the presence of suitable additions, for example in the presence of salts of organic acids, of bases, organic solvents or further agents which promote the complex formation.

The products obtainable according to the specified process are new. They are complex cobalt compounds which contain one atom of cobalt in complex combination with two molecules of different monoazo-dyestuffs of which one constitutes an o-hydroxy-o′-amino-monoazo-dyestuff which is free from water-solubilizing groups, while the other is an o:o′-dihydroxy-monoazo-dyestuff which is free from sulfonic acid and carboxyl groups and contains as water-solubilizing group at least one sulfonamide or a sulfone group or both, for example one —$SO_2C_2H_5$— and one —$SO_2NH_2$— group.

Mixtures of such cobaltiferous mixed complexes can be prepared by the above specified process by reacting agents providing cobalt of the specified type upon two or more of the above-defined dyestuff mixtures at the same time, or by reacting simultaneously one cobaltiferous 1:1-complex with two or more metal-free dyestuffs or also two or more metalliferous 1:1-complexes with one metal-free dyestuff in suitable quantity proportions.

The new cobaltiferous mixed complexes obtainable according to the above process are soluble in water. They are suitable for the dyeing and printing of a variety of substances, primarily for the dyeing of animal materials such as silk, leather and especially wool or also for the dyeing and printing of synthetic fibers from superpolyamides and superpolyurethanes. They are primarily suitable for dyeing from a weak alkaline, neutral or weakly acid bath. Wool dyeings thus obtained are distinguished by their uniformity, their purity and good fastness to light and also by a very good fastness to washing, fulling and rubbing.

The following examples illustrate the invention, the parts and percentages being by weight unless otherwise stated and the relation between part by weight and part by volume being the same as that between the kilogram and the liter.

*Example 1*

3.08 parts of the dyestuff from diazotized 5-nitro-2-amino-1-hydroxybenzene and 2-aminonaphthalene are dissolved in 300 parts of water at 80° C. together with 4.25 parts of the dyestuff from diazotized 2-amino-1-hydroxybenzene-4-sulfonic acid methylamide and 1-acetoacetylamino-2-chlorobenzene, 20 parts by volume of 2 N-sodium hydroxide solution being added. 20 parts of a solution of cobalt sulfate with a cobalt content of 3.25% are added and stirring is carried out for ½ hour at 80–85° C. When the metallization is complete the dyestuff is separated by addition of sodium chloride and neutralization with acetic acid and is filtered and dried. It forms a green powder which is soluble in water with a green color and in concentrated sulfuric acid with a brown color and dyes wool from a weakly alkaline, neutral or weakly acid bath in full green tints of good fastness properties.

In the following table there are listed further complex cobalt compounds which were obtained according to the above process. In columns I and II there are set out the two monoazo-dyestuffs which are in complex combination with the cobalt atom and in column III the color of the tints obtained on dyeing 100 parts of wool with 2 parts of the corresponding cobalt compound from an acetic acid bath.

| | I | II | III |
|---|---|---|---|
| 1 | 5-nitro-2-amino-1-hydroxybenzene → 2-aminonaphthalene (OH, $NO_2$ / $NH_2$) | 2-hydroxy-5-chloro with $-N=N-CH(COCH_3)-CONH-$ aryl, $SO_2NHCH(CH_3)_2$ substituent | green. |
| 2 | 5-nitro-2-amino-1-hydroxybenzene → 2-aminonaphthalene | 2-hydroxy-5-chloro with $-N=N-CH(COCH_3)-CONH-$ aryl, $SO_2CH_3$ substituent | green. |
| 3 | 5-nitro-2-amino-1-hydroxybenzene → 2-aminonaphthalene | pyrazolone coupling component with OH, $NO_2$, and $SO_2NH_2$ substituent | olive. |
| 4 | 5-nitro-2-amino-1-hydroxybenzene → 2-aminonaphthalene | pyrazolone coupling component with OH, Cl, and $SO_2NH_2$ substituent | olive-grey. |

| | I | II | III |
|---|---|---|---|
| 5 | 2-hydroxy-5-nitro-phenyl–N=N–2-amino-1-naphthyl | 2-hydroxy-4-methylsulfonyl-phenyl–N=N– (1-phenyl-3-methyl-5-hydroxy-pyrazole) | olive. |
| 6 | 2-hydroxy-5-nitro-phenyl–N=N–2-amino-1-naphthyl | 2-hydroxy-4-sulfamoyl-phenyl–N=N–1-hydroxy-2-naphthyl | blue-violet. |
| 7 | 2-hydroxy-5-nitro-phenyl–N=N–2-amino-1-naphthyl | 2-hydroxy-4-sulfamoyl-phenyl–N=N–1-hydroxy-4,8-dichloro-2-naphthyl | blue. |
| 8 | 2-hydroxy-3-nitro-phenyl–N=N–2-amino-1-naphthyl | 2-hydroxy-5-chloro-4-(N-methylsulfamoyl)-phenyl–N=N–1-hydroxy-2-naphthyl | blue. |
| 9 | 2-hydroxy-3-nitro-phenyl–N=N–2-amino-1-naphthyl | 2-hydroxy-3-sulfamoyl-5-nitro-phenyl–N=N–2-hydroxy-5-methyl-phenyl | grey-olive. |
| 10 | 2-hydroxy-3-nitro-phenyl–N=N–2-amino-1-naphthyl | 2-hydroxy-4-sulfamoyl-phenyl–N=N–1-hydroxy-(cyclohexylsulfamoyl)-2-naphthyl | greyish blue violet. |
| 11 | 2-hydroxy-4-nitro-phenyl–N=N–2-amino-1-naphthyl | 2-hydroxy-4-sulfamoyl-phenyl–N=N–(1-phenyl-3-methyl-5-hydroxy-pyrazole) | brown olive. |

As will be evident from the preceding table, the o:o'-dihydroxy-monoazo-dyestuffs (II) are made up from an o-hydroxydiazo-compound of the benzene series and, as coupling component, a compound which—e. g. as in items 3 to 11 of the table—couples in the adjacent or vicinal position to a hydroxyl group, or a compound which—e. g. as in items 1 and 2 of the table—includes an acetoacetic acid anilide radical and couples in α-position relatively to the anilide group.

*Example 2*

3.08 parts of the dyestuff from diazotized 5-nitro-2-amino-1-hydroxybenzene and 2-aminonaphthalene are suspended in 250 parts of water at 50° C. together with 4.18 parts of the dyestuff from diazotized 2-amino-1-hydroxybenzene-4-sulfonic acid isopropylamide and acetoacetanilide. After the addition of a solution of 1.55 parts of cobalt sulfate, 1.55 parts of tartaric acid and 4 parts of sodium hydroxide in 100 parts of water, the whole is heated to 80–85° C. until the metallization is complete, whereby a solution results. After cooling to room temperature, a difficultly soluble compound is filtered off. The filtrate is neutralized with acetic acid and the separated dyestuff isolated by filtration, washed with dilute sodium chloride solution and dried. It forms a green powder which is soluble in water with a green color and in concentrated sulfuric acid with a brown color; it dyes wool from a weakly alkaline, neutral or acetic acid bath in full, uniform green tints of good fastness properties.

*Example 3*

2 parts of the cobaltiferous dyestuff obtained according to paragraph 1 of Example 1 are dissolved in 4000 parts of water, 2 parts of 40% acetic acid or 4 parts of ammonium acetate are added and 100 parts of well wetted wool are entered at 40–50° C. into the resulting dye bath. The bath is brought to the boil within ½ hour and dyeing conducted at the boil for ¾ hour. The wool is finally rinsed with cold water and dried. The wool is dyed in green tints of good fastness to light and washing.

Similar dyeings are obtained by dyeing without the addition of acetic acid or ammonium acetate or by using superpolyamide fibers instead of wool.

With similar good results, the prepared dyebath can first be heated to about 85–90° C. and the goods to be dyed then entered at this temperature.

What is claimed is:

1. A complex cobalt compound which contains one atom of cobalt in complex combination with substantially two molecules of different monazo-dyestuffs of which one corresponds to the formula

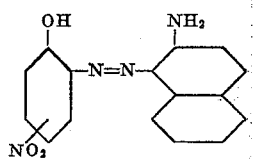

while the other contains as single water-solubilizing group a member selected from the class consisting of a sulfonamide group and a sulfone group and corresponds to the formula

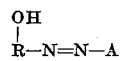

wherein R represents a benzene radical bound to the azo linkage in vicinal position to the OH group and A represents a member selected from the group consisting of the radical of an acetoacetic acid anilide bound to the azo linkage in α-position relatively to the anilide group, the 2-hydroxynaphthalene, the 5,8 - dichloro-1-hydroxynaphthalene and the 1-phenyl-3-methyl-5-pyrazolone-sulfonamide radicals bound to the azo linkage in vicinal position to their respective hydroxy group.

2. A complex cobalt compound which contains one atom of cobalt in complex combination with substantially two molecules of different monoazo-dyestuffs of which one corresponds to the formula

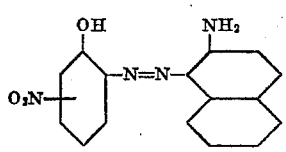

and the other corresponds to the formula

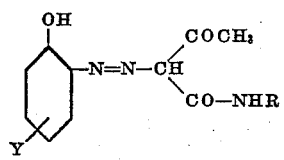

wherein R represents a benzene radical free from water solubilizing substituents and Y represents a sulfonic acid amide group.

3. A complex cobalt compound which contains one atom of cobalt in complex combination with substantially two molecules of different monoazo-dyestuffs of which one corresponds to the formula

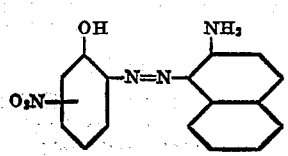

and the other corresponds to the formula

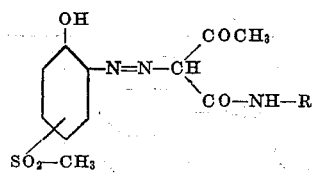

wherein R represents a benzene radical free from water solubilizing substituents.

4. A complex cobalt compound which contains one atom of cobalt in complex combination with substantially two molecules of different monoazo-dyestuffs of which one corresponds to the formula

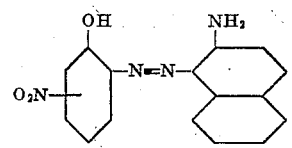

and the other corresponds to the formula

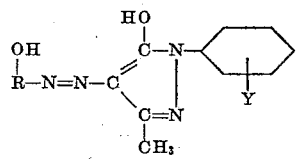

wherein R represents a benzene radical free from water solubilizing substituents and bound to the OH group in vicinal position of the azo linkage, and Y represents a sulfonic acid amide group.

5. A complex cobalt compound which contains one atom of cobalt in complex combination with substantially two molecules of different monoazo-dyestuffs of which one corresponds to the formula

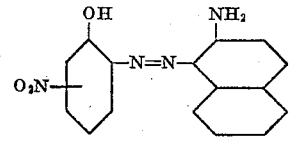

and the other corresponds to the formula

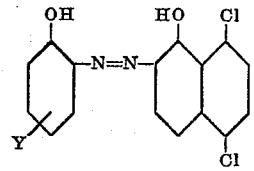

wherein Y represents a sulfonic acid amide group.

6. The complex cobalt compound containing one atom of cobalt bound in complex union with one molecule of each of the monoazo-dyestuffs corresponding to the formulae

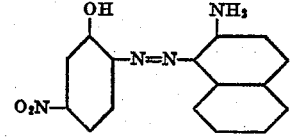

and

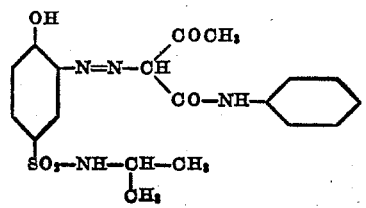

7. The complex cobalt compound containing one atom of cobalt bound in complex union with one molecule of each of the monoazo-dyestuffs corresponding to the formulae

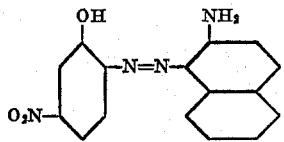

and

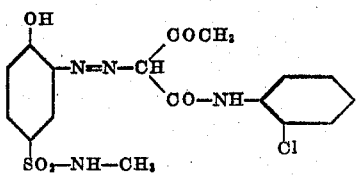

8. The complex cobalt compound containing one atom of cobalt bound in complex union with one molecule of each of the monoazo-dyestuffs corresponding to the formulae

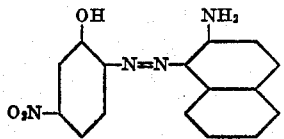

and

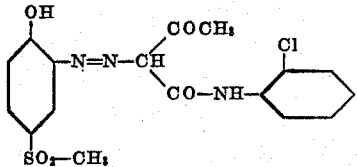

9. The complex cobalt compound containing one atom of cobalt found in complex union with one molecule of each of the monoazo-dyestuffs corresponding to the formulae

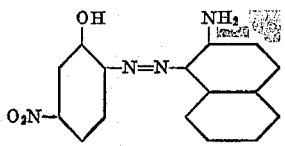

and

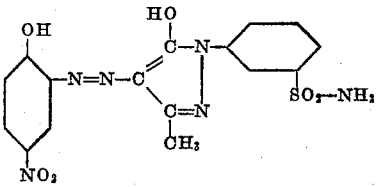

10. The complex cobalt compound containing one atom of cobalt bound in complex union with one molecule of each of the monoazo-dyestuffs corresponding to the formulae

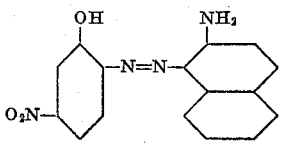

and

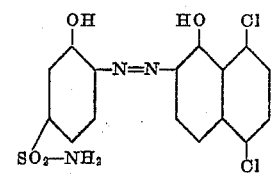

References Cited in the file of this patent
UNITED STATES PATENTS

| | | |
|---|---|---|
| 2,551,056 | Schetty | May 1, 1951 |
| 2,565,898 | Widmer et al. | Aug. 28, 1951 |
| 2,674,515 | Widmer et al. | Apr. 6, 1954 |
| 2,711,404 | Schetty | June 21, 1955 |
| 2,734,895 | Zickendraht et al. | Feb. 14, 1956 |
| 2,749,332 | Buehler et al. | June 5, 1956 |
| 2,766,230 | Buehler et al. | Oct. 9, 1956 |